United States Patent
Taira et al.

(10) Patent No.: US 9,984,401 B2
(45) Date of Patent: May 29, 2018

(54) MOBILE PRICE CHECK SYSTEMS, METHODS AND COMPUTER PROGRAM PRODUCTS

(71) Applicant: TrueCar, Inc., Santa Monica, CA (US)

(72) Inventors: Thomas Taira, Berkeley, CA (US); Jason Lee Melbourne, Santa Monica, CA (US); Michael D. Swinson, Santa Monica, CA (US); Jonathan Andrew Wahl, Marina Del Rey, CA (US)

(73) Assignee: TrueCar, Inc., Santa Monica, CA (US)

( * ) Notice: Subject to any disclaimer, the term of this patent is extended or adjusted under 35 U.S.C. 154(b) by 327 days.

(21) Appl. No.: 14/627,816

(22) Filed: Feb. 20, 2015

(65) Prior Publication Data

US 2015/0242926 A1 Aug. 27, 2015

Related U.S. Application Data

(60) Provisional application No. 61/944,335, filed on Feb. 25, 2014.

(51) Int. Cl.
*G06Q 30/00* (2012.01)
*G06Q 30/06* (2012.01)
*G06K 9/32* (2006.01)

(52) U.S. Cl.
CPC ..... *G06Q 30/0627* (2013.01); *G06Q 30/0641* (2013.01); *G06K 9/325* (2013.01)

(58) Field of Classification Search
None
See application file for complete search history.

(56) References Cited

U.S. PATENT DOCUMENTS

| | | | |
|---|---|---|---|
| 5,774,873 A | 6/1998 | Berent et al. | |
| 5,852,676 A * | 12/1998 | Lazar | G06K 9/00456 382/138 |
| 6,006,201 A | 12/1999 | Berent et al. | |
| 7,050,982 B2 | 5/2006 | Sheinson | |
| 7,219,080 B1 | 5/2007 | Wagoner et al. | |
| 7,624,065 B2 | 11/2009 | Schoen et al. | |

(Continued)

OTHER PUBLICATIONS

Audatex Directions, "Voice of the Customer: Audatex Holds Second Strategic Advisory Council Meeting and Forms New Technical Advisory Council", 2008, Audatex North America, Inc., vol. 03 , p. 17.*

*Primary Examiner* — Naeem U Haq
*Assistant Examiner* — Norman Sutch, Jr.
(74) *Attorney, Agent, or Firm* — Sprinkle IP Law Group

(57) ABSTRACT

A price check system may receive a vehicle identification number (VIN) or determine the VIN via an image from a mobile price check application. The price check system may determine if build data is available for a vehicle associated with the VIN and, if build data is available for the vehicle, determine one or more prices for the vehicle based on the build data and provide same to the mobile price check application. If build data is not available for the vehicle, the price check system may prepare and send a request to the mobile price check application to obtain configuration information on the vehicle from a user of the mobile price check application. The price check system may then determine one or more prices for the vehicle based on the configuration information and provide same to the mobile price check application in real time or substantially real time.

22 Claims, 10 Drawing Sheets

(56) References Cited

U.S. PATENT DOCUMENTS

| | | |
|---|---|---|
| 7,835,982 B2 | 11/2010 | Schoen et al. |
| 7,921,052 B2 | 4/2011 | Dabney et al. |
| 8,112,325 B2 | 2/2012 | Foy et al. |
| 8,126,881 B1 | 2/2012 | Sethi et al. |
| 8,230,362 B2 | 7/2012 | Couch |
| 8,326,845 B2 | 12/2012 | Sethi et al. |
| 8,375,037 B2 | 2/2013 | Sethi et al. |
| 8,521,619 B2 | 8/2013 | Perry, III et al. |
| 8,538,828 B2 | 9/2013 | Skutta |
| 8,589,212 B2 | 11/2013 | Pollak et al. |
| 8,595,082 B2 | 11/2013 | Skutta |
| 8,818,881 B2 | 8/2014 | Himmerick et al. |
| 8,868,572 B2 | 10/2014 | Sethi et al. |
| 9,103,743 B2 | 8/2015 | Couch |
| 9,104,718 B1 | 8/2015 | Levy et al. |
| 9,189,960 B2 | 11/2015 | Couch et al. |
| 9,324,104 B1 | 4/2016 | Levy et al. |
| 9,347,758 B2 | 5/2016 | Berent et al. |
| D765,089 S | 8/2016 | Agee |
| 9,412,203 B1 | 8/2016 | Garcia, III et al. |
| 9,465,873 B1 | 10/2016 | Franke et al. |
| 9,466,079 B2 | 10/2016 | Hygema et al. |
| D774,523 S | 12/2016 | Agee |
| D774,524 S | 12/2016 | Agee |
| 9,600,822 B2 | 3/2017 | Pyle et al. |
| 2002/0114515 A1* | 8/2002 | Hotta .................. G06K 9/2054 382/177 |
| 2006/0129423 A1 | 6/2006 | Sheinson et al. |
| 2006/0178973 A1 | 8/2006 | Chiovari et al. |
| 2007/0185777 A1 | 8/2007 | Pyle et al. |
| 2007/0250327 A1* | 10/2007 | Hedy .................... G06Q 30/00 705/306 |
| 2008/0219543 A1* | 9/2008 | Csulits .................. G07D 7/00 382/135 |
| 2009/0006118 A1 | 1/2009 | Pollak |
| 2009/0028445 A1* | 1/2009 | Wu .................. G06F 17/30253 382/225 |
| 2010/0070343 A1* | 3/2010 | Taira .................. G06Q 10/067 705/400 |
| 2010/0088158 A1 | 4/2010 | Pollack |
| 2010/0161408 A1 | 6/2010 | Karson et al. |
| 2010/0274571 A1 | 10/2010 | McFall et al. |
| 2010/0274631 A1 | 10/2010 | McFall et al. |
| 2011/0131652 A1 | 6/2011 | Robinson et al. |
| 2011/0202471 A1 | 8/2011 | Scott et al. |
| 2012/0005070 A1 | 1/2012 | McFall et al. |
| 2012/0101891 A1* | 4/2012 | Collier ............... G06Q 30/0234 705/14.34 |
| 2012/0233014 A1 | 9/2012 | Banks et al. |
| 2012/0246036 A1* | 9/2012 | Marr .................... G06Q 30/08 705/27.1 |
| 2012/0284087 A1 | 11/2012 | Pollak |
| 2012/0284113 A1 | 11/2012 | Pollak |
| 2012/0293664 A1* | 11/2012 | Hofman ............ G06K 9/00973 348/169 |
| 2013/0191247 A1 | 7/2013 | Huang et al. |
| 2013/0339173 A1 | 12/2013 | Skutta |
| 2014/0032352 A1 | 1/2014 | Fraser et al. |
| 2014/0032353 A1 | 1/2014 | Fraser et al. |
| 2014/0067615 A1 | 3/2014 | Park et al. |
| 2014/0089208 A1 | 3/2014 | Humble et al. |
| 2014/0164259 A1* | 6/2014 | Hildreth ............ G06Q 30/0278 705/306 |
| 2014/0229391 A1 | 8/2014 | East, III et al. |
| 2014/0257934 A1 | 9/2014 | Chrzan et al. |
| 2014/0258044 A1 | 9/2014 | Chrzan et al. |
| 2014/0278806 A1 | 9/2014 | Duguid et al. |
| 2014/0279020 A1 | 9/2014 | Duguid et al. |
| 2014/0279171 A1 | 9/2014 | Burgiss et al. |
| 2014/0279229 A1 | 9/2014 | Burgiss et al. |
| 2014/0279275 A1 | 9/2014 | Burgiss et al. |
| 2014/0351074 A1 | 11/2014 | Enge et al. |
| 2015/0058152 A1 | 2/2015 | Pollak et al. |
| 2015/0206206 A1 | 7/2015 | Puente et al. |
| 2015/0220876 A1 | 8/2015 | Sethi et al. |
| 2015/0324737 A1 | 11/2015 | Chrzan et al. |
| 2015/0324879 A1 | 11/2015 | Lu et al. |
| 2015/0356672 A1 | 12/2015 | Humble et al. |
| 2016/0343058 A1 | 11/2016 | Levy et al. |
| 2016/0371323 A1 | 12/2016 | Garcia, III et al. |

* cited by examiner

2013 Mazda Mazda3
What is the total MSRP (or "Total Price") shown on the window sticker in front of you?

$ |

VIN: WA1WMBFE3CD001163

$XX,XXX

☆☆☆☆☆
22 HWY   18 CTY

This number could also be called "Total Price", "Total Vehicle Price", or "Total Suggested Retail Price." It's the number that includes all options and the destination fee.

Next

Enter Dealer Accessories

Total MSRP
$23,919

2013 Mazda Mazda3

$ 1,000
$
$

Enter the price of any dealer installed accessories on the vehicle. Look for a second sticker on the window

| DEALER INSTALLED ACCESSORIES | |
|---|---|
| XXXXXX | $XXXX |
| XXXXXX | $XXXX |
| XXXXXX | $XXXX |
| XXXXXX | $XXXX |

Dealer accessories and port-installed options added to the vehicle after it leaves the factory. These are not included in the Total MSRP listed on the main window sticker. Instead, they most often appear on a smaller sticker near the main window sticker.

Next

Price Check — 4:21 PM

VIN: WA1WMBFE3CD001163

2013 Mazda Mazda3

Price Checked July, 13, 2013 1:11pm

| | |
|---|---|
| Total MSRP | ~~$35,550~~ |
| Your Vehicle Price | $30,295 |
| You Save! | $5,255 |

UNDERSTANDING YOUR PRICE

| | |
|---|---|
| Base MSRP | $29,490 |
| Total Options > | +$3,458 |
| Destination Fee | +$860 |
| Dealer Accessories Edit | +$500 |
| Guaranteed Savings > | -$4,035 |
| Additional Savings > | -$470 |
| Additional Incentives Edit | -$750 |
| Your Vehicle Price | $30,295 |

| | |
|---|---|
| Doc Fees | +$75 |
| Tax | $2,802 |
| Title | $300 |
| License | $200 |
| Additional Fees | $25 |
| Your Out The Door Price | $33,697 |

DEALER INFO

Mazda Dealer
8040 Road
Santa Monica, 90401

Patrick Henry
Sue Kim

NOTES
Tap to add notes

Explanation of Terms >

Price Check Another Car

MOBILE PRICE CHECK SYSTEMS, METHODS AND COMPUTER PROGRAM PRODUCTS

CROSS REFERENCE TO RELATED APPLICATION(S)

This application is a conversion of and claims a benefit of priority from U.S. Provisional Application No. 61/944,335, filed Feb. 25, 2014, entitled "MOBILE PRICE CHECK SYSTEMS, METHODS AND COMPUTER PROGRAM PRODUCTS," which is incorporated by reference, with all appendices and attachments thereto, as if set forth herein in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates generally to price analysis. More particularly, embodiments disclosed herein relate to systems, methods, and computer program products for on-the-spot mobile automotive pricing.

BACKGROUND OF THE RELATED ART

Historically, there has been price confusion when a consumer visits a dealership to purchase a vehicle. With the help of the Internet, today's consumers can do their research online before they visit any dealerships. However, as far as the actual sales price is concerned, what the consumers can glean from the web sites online is quite limited.

For example, a web site may list a price such as a manufacturer's suggested retail price (MSRP) for a vehicle. However, there is no guarantee that that is the price for that particular vehicle or that particular vehicle is actually on the lot of a particular dealership.

As another example, a web site may allow a consumer to specify a desired configuration of a vehicle and obtain a price for the vehicle from a dealer affiliated with the web site (or an entity owning the web site). However, the consumer may not find out until after they have made an effort and traveled to the dealership that the exact vehicle does not exist—either the vehicle with the desired configuration is not part of that particular dealer's inventory or that virtual vehicle configuration does not exist physically.

Understandably, the current at-the-dealer auto buying experience still leaves consumers confused and unprepared to navigate the complexities of purchasing a new or used vehicle. Consequently, there is room for innovations and improvements.

SUMMARY OF THE DISCLOSURE

When a consumer finds a price for a year, make, and model online, they may not realize that they may be getting a price for a virtual vehicle and not necessarily for an actual vehicle they can find on the lot. They may therefore distrust the salesperson who tells them that the vehicle with the exact configuration is not available, that the price they saw online does not exist, and/or that a vehicle with a similar, but not exactly the same, configuration is available at a different, usually higher, price. At this point, the consumer is on the lot at a dealership. Even if the consumer has access to the Internet, there are no online tools to help them understand and/or verify individual costs and reconcile the price difference between what they saw online and what is offered on the lot. Even with the proliferation of Internet-enabled mobile devices, there are no mobile tools available today that can guarantee a price for a vehicle while a potential customer is browsing vehicles on the lot at a dealership.

Because what a potential customer sees online is not what they get at the lot, the potential customer may not trust the dealership and/or the web site from where the price is obtained. Worse yet, the potential customer may leave the dealership and/or discontinue using the web site altogether. Indeed, the potential customer may visit a dealership that is not affiliated with the web site and ask the non-affiliated dealership to match the price for a vehicle available on the lot.

Recognizing these challenges, an object of embodiments disclosed herein is to ensure that an accurate price is associated with each individual car that a web site visitor (a potential customer) is interested in purchasing. Another object is to provide an incentive for visitors of a web site to shop at dealerships affiliated with the web site, to thereby increase the close rate of sales resulted from the leads provided by the web site.

These and other objects can be realized in a vehicle data system embodied on one or more server machines communicatively connected to various computing devices over a network. In some embodiments, the vehicle data system may include a price check system that can: receive a vehicle identification number (VIN) from a mobile price check application running on a client device while a user using the client device is perhaps in physical proximity to a vehicle bearing the VIN. The price check system may determine whether build data is available for a vehicle associated with the VIN. If build data is available for the vehicle, the price check system may determine one or more prices for the vehicle based on the build data. Whether the build data is or is not available for the vehicle, in some embodiments, the price check system may request, for instance, via the mobile price check application, configuration information on the vehicle from the user and determine one or more prices for the vehicle based on the configuration information provided by the user and/or the build data. The one or more prices may include at least one of an upfront dealer price or an average market price.

The price check application may be configured to receive the vehicle identification number via an image captured by the user on the client device which, in some embodiments, can be a mobile device such as a cellar phone, smartphone, tablet, or laptop. In some embodiments, an image processing tool of the price check system may implement a unique VIN-optical character recognition algorithm for preprocessing the image before an optical character recognition is performed.

In some embodiments, preprocessing an image may include performing an enhancement procedure and/or a character-by-character extraction on characters in the image. In some embodiments, preprocessing an image may include performing a character-by-character extraction to extract characters from the image and arranging the extracted characters in a new image. Additional enhancement(s) may also be applied before an optical character recognition may be performed on the new image.

In some embodiments, a method may include a price check system embodied on one or more server machines receiving a vehicle identification number from a mobile price check application or determining the vehicle identification number via an image from the mobile price check application, the mobile price check application embodied on non-transitory computer memory of a client device communicatively connected to the price check system over a network. The method may further comprise the price check system determining if build data is available for a vehicle associated with the vehicle identification number and, if build data is available for the vehicle associated with the vehicle identification number, the price check system determining one or more prices for the vehicle based on the build data and providing the one or more prices for the vehicle to the mobile price check application. The method may further comprise, if build data is not available for the vehicle associated with the vehicle identification number, the price check system preparing and sending a request to the mobile price check application. The mobile price check application may prompt a user of the client device for configuration information on the vehicle and communicate the configuration information to the price check system. The method may further comprise the price check system determining one or more prices for the vehicle based on the configuration information from the mobile price check application and providing the one or more prices for the vehicle to the mobile price check application.

One embodiment may comprise a system having a processor and a memory and configured to implement the method. One embodiment may comprise a computer program product that comprises a non-transitory computer-readable storage medium which stores computer instructions that are executable by at least one processor to perform the method. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein:

FIGS. 8A-8G depict diagrammatic representations of example user interfaces that may be used in conjunction with the systems and methods disclosed herein.

DETAILED DESCRIPTION

Figure 1:
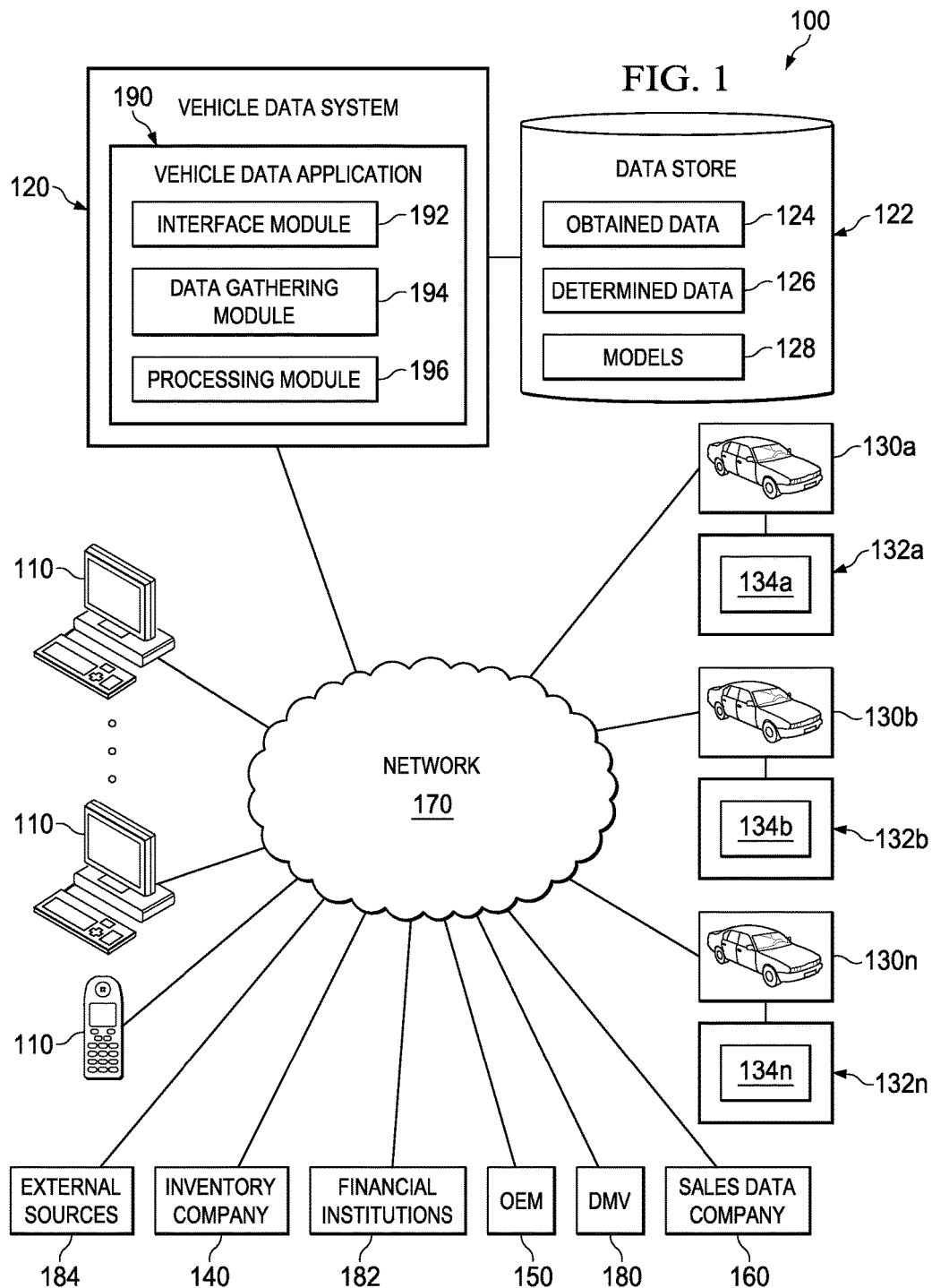
FIG. 1 depicts one embodiment of a topology including a vehicle data system.

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Embodiments disclosed provide mobile price check systems, methods, and computer program products for facilitating consumers in making decisions about purchasing vehicles while they are at the dealership. Advantageously, embodiments allow customers to walk the lot of an affiliated dealership and get a guaranteed, no haggle, and upfront price for any new vehicle at the affiliated dealership (also referred to as the dealer price). While at the lot, a user of a mobile device may upload a vehicle identification number (VIN) of a vehicle via a price check application running on the mobile device. To do so, the user may manually type in the VIN, scan a barcode, or snap a photo of the VIN. In one embodiment, the user may only need to type in the last five digits of the VIN. A price check server at the backend may then, in real time or substantially real time, determine an upfront, no-haggle price for the specific VIN and present same to the user on the mobile device. In some embodiments, the server may instead provide an average market price, or both the upfront price and the average market price. Other pricing information on the vehicle may additionally or alternatively determined and displayed.

In some embodiments, if the VIN or other information is not available, the user may be presented with questions via a user interface of the price check application. Based at least partially on the answers to the questions price check server at the backend may then, in real time or substantially real time, determine pricing information for the vehicle such as an upfront, no-haggle price for the specific VIN and/or average market price and present same to the user on the mobile device Embodiments can provide many advantages. For example, the ability for a potential customer to do a price check on an actual vehicle in real time or substantially real time can close the gap between the potential customer's online experience and the at-the-dealer purchase process, providing a peace of mind that "what you see online is what you get at the dealership."

Since an actual price on a vehicle is provided, price confusion can be reduced and consumers can save time because they do not need to sit down with a dealer in order to get that actual price for the vehicle. In addition, embodiments may provide consumers with greater visibility as to what they may get for that specific vehicle (from other affiliated dealerships) as well as what other people paid for the vehicle (whether they purchased from affiliated dealerships or not), while they are browsing vehicles on the lot.

This superior at-the-dealer experience can draw more visitors to affiliated dealerships and, correspondingly, increase the close rate. Since these visitors are fully-empowered with the knowledge of dealer prices, they can shop for any new vehicle on the lot during their visits.

Embodiments can also help the affiliated dealerships. For example, a salesperson can run an embodiment of a vehicle pricing application on a mobile device, create an offer for a potential customer using the application, present the offer to the potential customer (whether she had visited the web site or not), and show her the dealer price for a particular vehicle that she is interested in purchasing. The potential customer may also run a price check on the particular vehicle using an embodiment of a price check application disclosed herein. This changes the conversation at the dealership from sounding like pushing for a sale (e.g., "let me talk to my manager") to helping a customer finding out the exact dealer price for a particular vehicle (e.g., "let's do a price check on this car together.") In embodiments disclosed herein, dealerships that participate in a program made available to visitors of a web site (e.g., truecar.com) are referred to as affiliated dealerships.

As another example, in some embodiments, the location information of a potential customer requesting a price check for a particular vehicle on a lot of an affiliated dealership can be communicated to the affiliated dealership in real time or substantially real time. This can provide a greater visibility to affiliated dealerships as they now have the knowledge of when potential customers are there on the lot and what vehicle(s) the potential customers may be interested in purchasing.

The ability to accurately price an actual vehicle on the spot can help to shorten the often dreaded negotiation process and improve the overall vehicle purchasing process. As a result, affiliated dealerships can have more confidence in leads provided by the web site and consumers have a reason to visit an affiliated dealership.

Before discussing specific embodiments, a brief overview of the context of the disclosure may be helpful.

FIG. 1 depicts one embodiment of a topology which may be used to implement embodiments of the systems and methods disclosed herein. Topology 100 comprises a set of entities including vehicle data system 120 which is coupled through network 170 to computing devices 110 (e.g., computer systems, personal data assistants, kiosks, dedicated terminals, mobile telephones, smart phones, etc.), and one or more computing devices at inventory companies 140, original equipment manufacturers (OEM) 150, sales data companies 160, financial institutions 182, external information sources 184, departments of motor vehicles (DMV) 180 and one or more associated point of sale locations, in this embodiment, car dealers 130. Computing devices 110 may be used by consumers while conducting a search for consumer goods and/or services, such as automobiles. Network 170 may be for example, a wireless or wired communication network such as the Internet or wide area network (WAN), publicly switched telephone network (PTSN) or any other type of electronic or non-electronic communication link such as mail, courier services or the like.

Vehicle data system 120 may comprise one or more computer systems with central processing units executing instructions embodied on one or more computer readable media where the instructions are configured to perform at least some of the functionality associated with embodiments disclosed herein. These applications may include a vehicle data application 190 comprising one or more applications (instructions embodied on one or more non-transitory computer readable media) configured to implement an interface module 192, data gathering module 194 and processing module 196 utilized by the vehicle data system 120. Furthermore, vehicle data system 120 may include data store 122 operable to store obtained data 124, data 126 determined during operation, models 128 which may comprise a set of dealer cost model or price ratio models, or any other type of data associated with embodiments disclosed herein or determined during the implementation of those embodiments.

Vehicle data system 120 may provide a wide degree of functionality, including utilizing one or more interfaces 192 configured to, for example, receive and respond to queries from users at computing devices 110; interface with inventory companies 140, manufacturers 150, sales data companies 160, financial institutions 182, DMVs 180 or dealers 130 (130a, 130b, . . . , 130n) to obtain data; or provide data obtained, or determined, by vehicle data system 120 to any of inventory companies 140, manufacturers 150, sales data companies 160, financial institutions 182, DMVs 180, external data sources 184 or dealers 130. It will be understood that the particular interface 192 utilized in a given context may depend on the functionality being implemented by vehicle data system 120, the type of network 170 utilized to communicate with any particular entity, the type of data to be obtained or presented, the time interval at which data is obtained from the entities, the types of systems utilized at the various entities, etc. Thus, these interfaces may include, for example, web pages, web services, a data entry or database application to which data can be entered or otherwise accessed by an operator, or almost any other type of interface which it is desired to utilize in a particular context.

In general, then, using these interfaces 192 vehicle data system 120 may obtain data from a variety of sources, including one or more of inventory companies 140, manufacturers 150, sales data companies 160, financial institutions 182, DMVs 180, external data sources 184 or dealers 130 and store such data in data store 122. This data may be then grouped, analyzed or otherwise processed by vehicle data system 120 to determine desired data 126 or models 128 which are also stored in data store 122.

A user at computing device 110 may access vehicle data system 120 through the provided interfaces 192 and specify certain parameters, such as a desired vehicle configuration or incentive data the user wishes to apply, if any. The vehicle data system 120 can select a particular set of data in the data store 122 based on the user specified parameters, process the set of data using processing module 196 and models 128, generate interfaces using interface module 192 using the selected data set on the computing devices 110 and data determined from the processing, and present these interfaces to the user at the user's computing device 110. Interfaces 192 may visually present the selected data set to the user in a highly intuitive and useful manner.

A visual interface may present at least a portion of the selected data set as a price curve, bar chart, histogram, etc. that reflects quantifiable prices or price ranges (e.g., "average," "good," "great," "overpriced," etc.) relative to reference pricing data points (e.g., invoice price, MSRP, dealer cost, market average, internet average, etc.). Using these types of visual presentations may enable a user to better understand the pricing data related to a specific vehicle configuration. Additionally, by presenting data corresponding to different vehicle configurations in a substantially identical manner, a user can easily make comparisons between pricing data associated with different vehicle configurations. To further aid the understanding for a user of the presented data, the interface may also present data related to incentives which were utilized to determine the presented data or how such incentives were applied to determine presented data.

Turning to the various other entities in topology 100, dealer 130 (130a, 130b, . . . , or 130n) may be a retail outlet for consumer goods and/or services, such as vehicles manufactured by one or more of OEMs 150. To track or otherwise manage sales, finance, parts, service, inventory and back office administration needs, dealer 130 (130a, 130b, . . . , or 130n) may employ a dealer management system (DMS) 132 (132a, 132b, . . . , or 132n, respectively). Since many DMS 132 are Active Server Pages (ASP) based, transaction data 134 (134a, 134b, . . . , or 134n, respectively) may be obtained directly from the DMS 132 with a "key" (for example, an ID and Password with set permissions within the DMS system 132) that enables data to be retrieved from the DMS system 132. Many dealers 130 may also have one or more web sites which may be accessed over network 170, where pricing data pertinent to the dealer 130 may be presented on those web sites, including any pre-determined, or upfront, pricing. When dealers 130 present prices online through inventory management providers, these online prices may be referred to as "internet prices". Such internet prices are generally not "no-haggle" prices. However, when dealers 130 present pricing information through vehicle data system 120, the prices are guaranteed "no-haggle" prices (i.e., prices with no negotiation). Thus, an "internet price" for a dealer's 2014 Honda Accord on Cars.com is likely to be the same price that appears on AutoTrader, MSN Autos, etc., but the no-haggle price for the same vehicle through vehicle data system 120 is likely to be unique to vehicle data system 120.

Inventory companies 140 may be one or more inventory polling companies, inventory management companies or listing aggregators which may obtain and store inventory data from one or more of dealers 130 (for example, obtaining such data from DMS 132). Inventory polling companies are typically commissioned by the dealer to pull data from a DMS 132 and format the data for use on websites and by other systems. Inventory management companies provide tools and interfaces to allow dealers to manage their own inventories. Some inventory management companies may further upload or present inventory information (photos, description, specifications) on behalf of the dealer. Listing aggregators may get dealer inventory directly from inventory feeds. For example, a dealer may sign up with a dealership inventory management company such as HomeNet. HomeNet pulls the dealer's vehicle inventory out of the DMS and then publishes it to sites like AutoTrader on behalf of the dealer. There are also "scraping" sites such as AutoTempest that do not necessarily have access to inventory feeds.

DMVs 180 may collectively include any type of government entity to which a user provides data related to a vehicle. For example, when a user purchases a vehicle it must be registered with the state (for example, DMV, Secretary of State, etc.) for tax and titling purposes. This data typically includes vehicle attributes (for example, model year, make, model, mileage, etc.) and sales transaction prices for tax purposes.

Financial institution 182 may be any entity such as a bank, savings and loan, credit union, etc. that provides any type of financial services to a participant involved in the purchase of a vehicle. For example, when a buyer purchases a vehicle they may utilize a loan from a financial institution, where the loan process usually requires two steps: applying for the loan and contracting the loan. These two steps may utilize vehicle and consumer information in order for the financial institution to properly assess and understand the risk profile of the loan. Typically, both the loan application and loan agreement include proposed and actual sales prices of the vehicle.

Sales data companies 160 may include any entities that collect any type of vehicle sales data. For example, syndicated sales data companies aggregate new and used sales transaction data from DMS 132 systems of particular dealers 130. These companies may have formal agreements with dealers 130 that enable them to retrieve data from dealer 130 in order to syndicate the collected data for the purposes of internal analysis or external purchase of the data by other data companies, dealers, and OEMs.

Manufacturers 150 can be those entities which actually build the vehicles sold by dealers 130. To guide the pricing of their vehicles, manufacturers 150 may provide an Invoice price and a Manufacturer's Suggested Retail Price (MSRP) for both vehicles and options for those vehicles—to be used as general guidelines for the dealer's cost and price. These fixed prices are set by the manufacturer and may vary slightly by geographic region.

External information sources 184 may comprise any number of other various source, online or otherwise, which may provide other types of desired data, for example data regarding vehicles, pricing, demographics, economic conditions, markets, locale(s), consumers, etc.

It should be noted here that not all of the various entities depicted in topology 100 are necessary, or even desired, in embodiments disclosed herein, and that certain of the functionality described with respect to the entities depicted in topology 100 may be combined into a single entity or eliminated altogether. Additionally, in some embodiments other data sources not shown in topology 100 may be utilized. Topology 100 is therefore exemplary only and should in no way be taken as imposing any limitations on embodiments disclosed herein.

Figure 2:
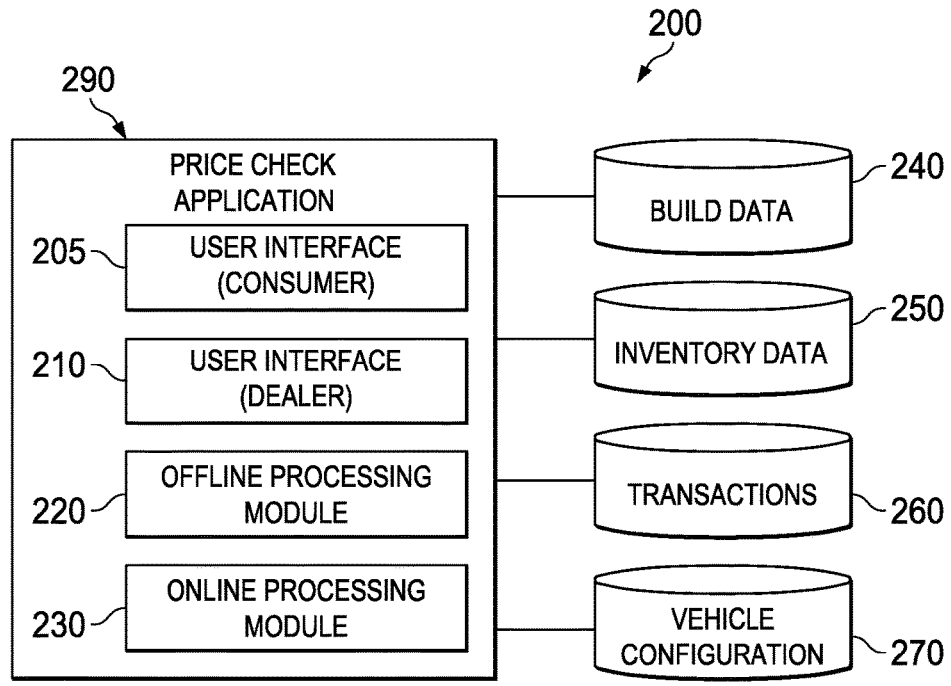
FIG. 2 depicts a diagrammatic representation of one embodiment of a price check system.

Some embodiments of topology 100 may be adapted to implement a price check system, a diagrammatic representation of which is shown in FIG. 2. For example, price check system 200 may comprise price check application 290 running on one or more server machines in topology 100. In some embodiments, price check application 290 may be implemented as part of vehicle data system 120 described above. In some embodiments, price check application 290 may comprise offline processing module 220 and online processing module 230. In some embodiments, price check application 290 may be configured for providing consumer-centric user interface 205 and/or dealer-centric user interface 210.

As shown in FIG. 2, price check application 290 may be communicatively connected or otherwise have access to data sources such as build data 240, inventory data 250, vehicle transaction data 260, and vehicle configuration data 270. In one embodiment, build data 240, inventory data 250, vehicle transaction data 260, and vehicle configuration data 270 may persist in data store 122 described above. Build data 240 may be obtained or received from manufacturers (e.g., OEMs 150) as described above and may include specific build information associated with a particular vehicle. Inventory data 250 may be obtained or received from inventory companies and/or dealers (e.g., inventory companies 140 and/or dealers 130) as described above. Inventory data 250 may include, for each vehicle in a dealer's inventory, a VIN and identification associated with the dealer having the vehicle in inventory. Vehicle transaction data 260 may include sales data on similar vehicles and may be obtained from dealers 130 and/or other parties as described above. Vehicle configuration data 270 may include records of potential options and/or configurations that may be available for a particular make and model of vehicle and that may also be obtained from manufacturers as discussed above.

Figure 3A:
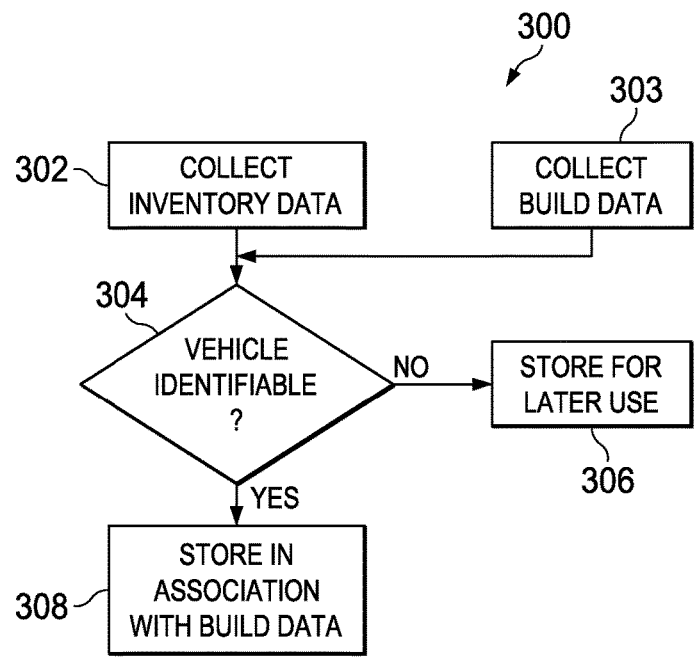
FIG. 3A and FIG. 3B depict flow charts illustrating methods for processing information for a price check system according to one embodiment disclosed herein.

In some embodiments, offline processing module 220 of price check application 290 may operate to process raw data for use by online processing module 230. One example of this process is illustrated in FIG. 3A. In some embodiments, the raw data may be collected from various data sources. In such cases, offline processing module 220 may process the raw data and generate a more uniform data set (e.g., vehicle records 270) for use by online processing module 230.

As illustrated in FIG. 3A, method 300 may comprise collecting inventory data (step 302). Such inventory data can be collected from many possible data sources. For example, inventory data may be obtained from affiliated dealers as well as non-affiliated dealers. In addition, build data on actual vehicles built by vehicle manufacturers may be collected, e.g., from the manufacturers (step 303). On the one hand, build data from manufacturers may be more accurate and reflect options installed by the manufacturer at the point of vehicle assembly as well as port-installed options. However, they may not reflect dealer options (e.g., dealer accessories) installed by the dealers. On the other hand, inventory data may include additional information not found in build data. However, they may not be accurate and/or complete. For example, dealers may or may not list all the dealer accessories such as sunroof, tinted windows, etc. that they installed on individual vehicles.

Method 300 may further comprise determining if a particular vehicle in a dealer's inventory has associated build data from a manufacturer (step 304). For example, this may include checking a VIN of the vehicle from the collected inventory data with a VIN from the manufacturer's build data. If such information is available (i.e., the vehicle's VIN is identifiable in the manufacturer's build data), then the build data is collected and stored or otherwise associated with the inventory data (step 308). As will be explained in greater detail below, this information can then, upon consumer request, be used to generate an average market price and/or an upfront dealer price.

If such information is not available, then the vehicle is flagged as having missing data and the associated inventory data for the vehicle is stored for later use (step 306). In this case, an upfront dealer price and an average market price may still be generated, but the consumer will be prompted to provide additional information, and configuration data 270 will be used to generate the price(s), as will be explained in greater detail below.

Figure 3B:
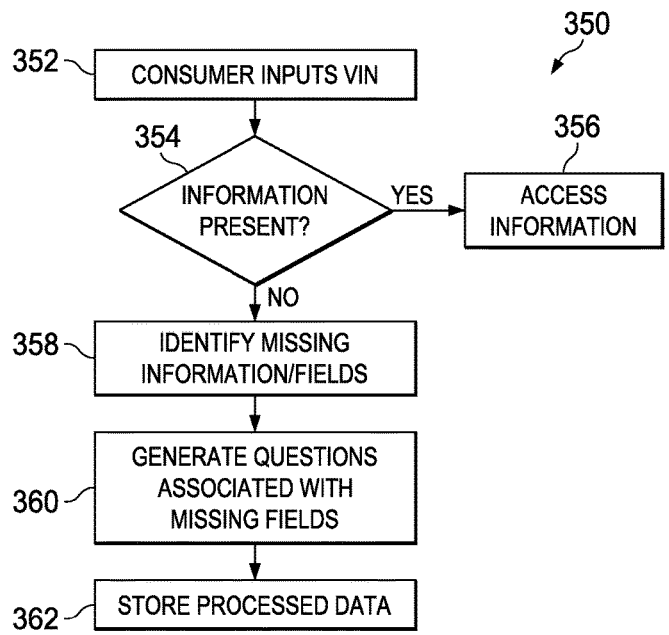

In particular, online processing module 230 may reference build data or configuration data to determine an upfront vehicle or average market price, as shown in method 350 of FIG. 3B. As will be discussed in greater detail below, a consumer may enter a VIN of a vehicle into a mobile price check application, perhaps while the consumer is in physical proximity to the vehicle on a dealer's lot (step 352). The VIN is received over the network by online processing module 230, which determines if build data is present for the particular vehicle identified by the VIN, for instance, by accessing persisted build data 240 (step 354). If so, the build data is used to determine the upfront vehicle price and/or the average market price for the particular vehicle associated with the VIN (step 356).

If build data for the particular vehicle is not available, then method 350 may identify missing information/field(s) (step 358) and may generate questions to ask for the information needed (360). Not all fields may need to be filled. Method 350 may determine the minimum amount of information needed to calculate an invoice price (also referred to as the dealer cost) for the particular vehicle associated with the VIN. As explained below, such questions can be presented by online processing module 230 to potential customers while they are at the dealer's lot browsing vehicles. The processed information may be stored or otherwise persisted (362), for instance, in vehicle configuration data 270.

Example components and functions of the online processing module implementing embodiments disclosed herein are described below with reference to FIGS. 4-5.

Figure 4:
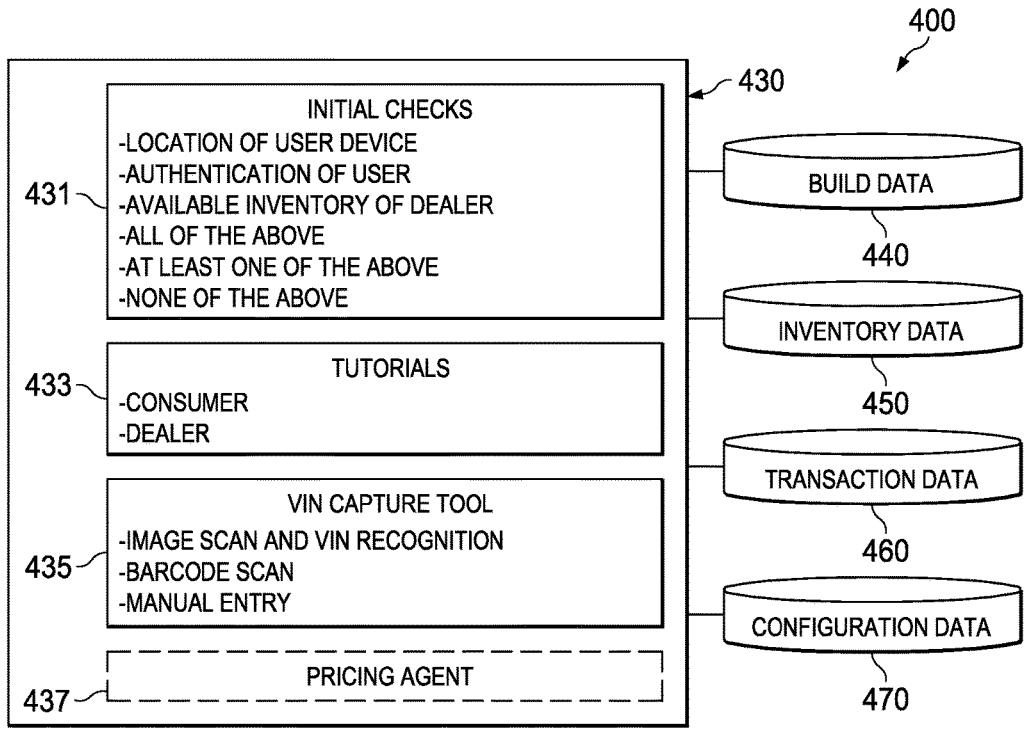
FIG. 4 depicts a diagrammatic representation of one embodiment of a price check system.

FIG. 4 depicts a diagrammatic representation of one embodiment of price check system 400 comprising online processing module 430, build data 440, inventory data 450, vehicle transaction data 460, and vehicle configuration data 470. Online processing module 430 may implement an embodiment of online processing module 230 of FIG. 2. Build data 440, inventory data 450, vehicle transaction data 460, and vehicle configuration data 470 may be constructed in the same or similar process as build data 240, inventory data 250, vehicle transaction data 260, and vehicle configuration data 270 described above. In this example, online processing module 430 may include function 431 configured for performing initial check(s) such as the location of a user device from where a request for price check on a particular VIN is received. Additionally, online processing module 430 may authenticate the user requesting the price check. If the location of the user device can or is determined, online processing module 430 may determine if the user is at a certain dealership and check the inventory of that dealership.

In some embodiments, these initial checks can all be optional. That is, online processing module 430 may perform all, some, or none of these initial checks. For example, knowing the location of a user device (e.g., zip code, latitude and longitude, etc.) from where a request for price check on a particular VIN is received can help online processing module 430 to determine if the requesting user is at a particular dealership and, if so, pull the inventory of that dealership from inventory data 450. If the inventory of that dealership is available, only the last five digits of the VIN would be needed to identify the correct vehicle. This is a fast and efficient way to correctly identify a vehicle from a huge database of all available vehicles in the universe; however, this is not the only way to identify a vehicle for price check. Indeed, in some embodiments, a vehicle may be identified using all digits (e.g., 17 digits) in a VIN. In such embodiments, there may not be a need to check the inventory of the dealership and this initial check may be skipped. A goal here is to identify 17-digit VIN as quickly as possible, with as little customer input as possible. So, if the inventory at a dealership is known, then the customer only needs to provide the last 5 digits of the VIN in order to do a match. If the dealer inventory is not known, then the customer is asked to provide the 17 digit VIN in its entirety.

Independently, online processing module 430 may still check the location of a user device. This is because such location information can help tracking potential customers while they are on the lot browsing vehicles. In some embodiments, online processing module 430 may use the location information to identify one or more dealerships and notify the dealership(s) about potential customers who are at or near the dealership(s). This initial check may be skipped in embodiments that do not track potential customers.

In some embodiments, online processing module 430 may further comprise function 433 configured for providing a tutorial to a user via a user interface (e.g., consumer-centric user interface 205 or dealer-centric user interface 210). In some embodiments, a tutorial is required when a user first log in to price check system 400 and optional thereafter.

In some embodiments, online processing module 430 may further comprise function 435 configured for capturing a VIN via a user interface (e.g., consumer-centric user interface 205 or dealer-centric user interface 210). This can be done in several ways and online processing module 430 may provide a user with a selection of options to enter a VIN. For example, the user may choose to take a picture of the VIN from the VIN plate or window sticker posted on the vehicle. The picture of the VIN is sent to price check system 400 and processed to obtain a digital readout of that VIN. This transformation can be done using publicly available technologies such as optical character recognition (OCR), pattern recognition, etc.

In some embodiments, price check system 400 may include an image processing tool configured for eliminating image artifacts caused by shadows, reflections, dirty windows, etc. that may have come from taking pictures through a glass (e.g., windshield, window, etc.). Specifically, a thresholding algorithm may be applied to each character. This breaks down the image character by character and creates a sub image around each character, determine which local background is for what character, and remove the local background for that particular character. The ability to correct sub image by sub image allows the image artifacts to be removed from the VIN more uniformly. This can be a complex process as an image may have different types of artifacts across part or all of the image (e.g., some shadow on one side of the image and some reflection on the other side of the image.) The result is a much better conversion from images to digital readouts. This new image processing tool can be useful for capturing all 17 digits of a VIN. Particularly, this new image processing tool can be useful in embodiments where inventory data is not available. Also, this tool can radically improve the result of digitizing an image taken through a glass (indoor and/or outdoors) where certain image artifacts (e.g., shadows, reflections, dirt, etc.) may not exist in typical OCR-enabled scanners. Conventionally, a single threshold filter is applied to the full image. This does not work well when there are shadows that varied across the image.

For example, in some embodiments, the image processing tool may implement a unique a VIN Optical Character Recognition (VIN-OCR) algorithm. The VIN-OCR algorithm is not a general purpose OCR routine. Instead, the VIN-OCR is particularly optimized to return a 17 character VIN number from images of window stickers, vehicle VIN plates, or the like. It understands VIN numbers. Based on its knowledge of VIN numbers, for instance, characters I, Q and O are excluded from possible OCR results. The VIN-OCR algorithm allows for matching a VIN image to a particular dealer's inventory vehicle accurately every single time or nearly every single time, even when not every character can be optically recognized correctly.

In some embodiments, the image processing tool may be embodied on non-transitory computer memory, perform the VIN-OCR algorithm responsive to a request from a client device, and provide output to an OCR engine. An example process is shown in FIG. 7.

Figure 7:
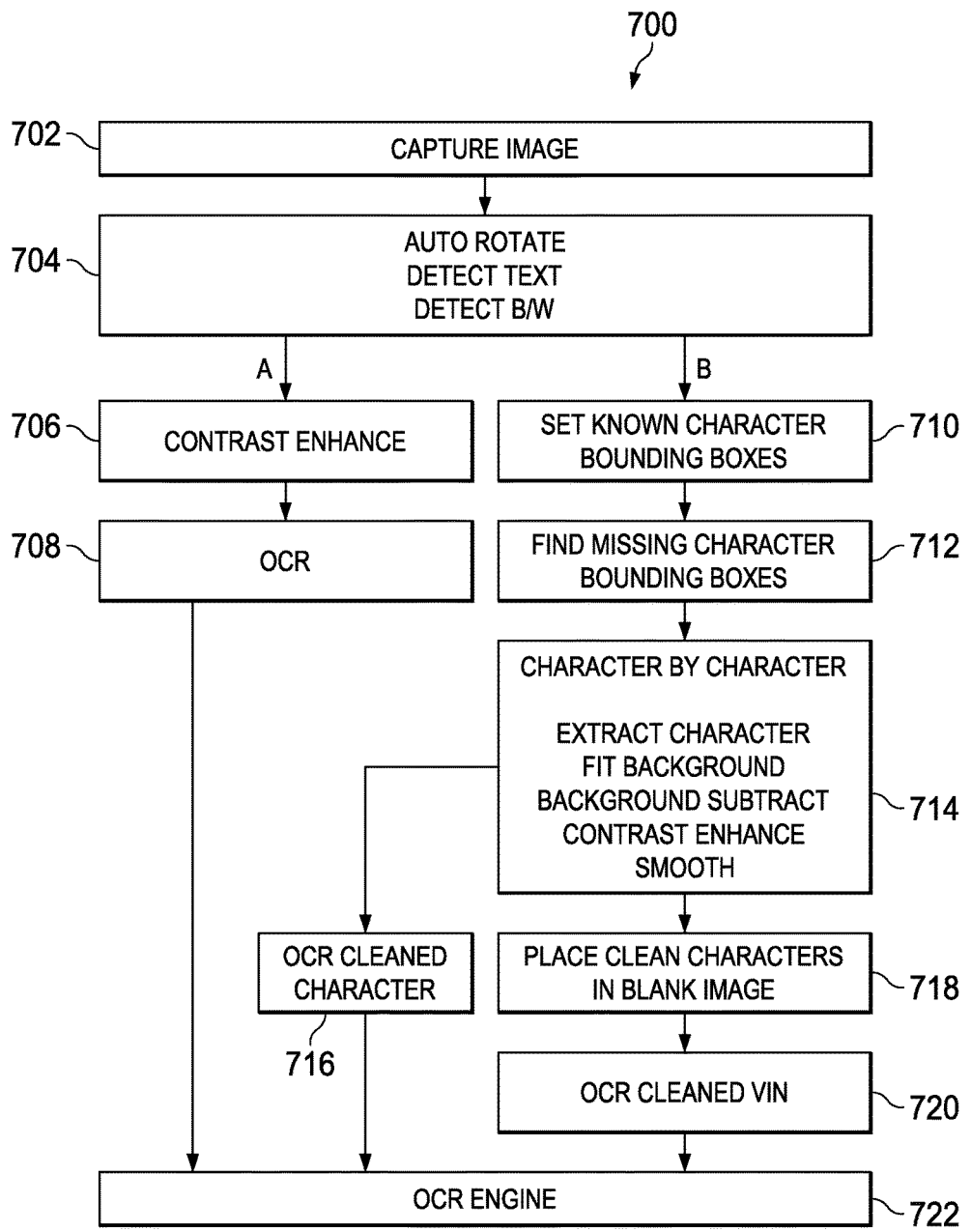
FIG. 7 depicts a flow chart illustrating a method for OCR processing according to one embodiment disclosed herein.

In the example of FIG. 7, process 700 may begin when an image of a VIN is captured and communicated over the network to the image processing tool via the mobile price check application described above (step 702). The image processing tool may perform one or more steps to determine if the image is readable, such as auto rotate, text detection, and black/white detection (step 704). This allows the image processing tool to determine if a quick enhancement routine will be adequate (path "A") or if a full, more advanced enhancement routine should be used (path "B"). With the quick enhancement routine, a contrast enhancement procedure may be carried out on the image (step 706). In some embodiments, this may include applying sigmoidal threshold on the full image to improve contrast. Other contrast enhancement techniques may be used, however. Once this filtering is applied, then the actual OCR may be performed (step 708), for instance, by an OCR engine. Any suitable OCR engine may be used. For example, a Tesseract OCR engine may be employed. OCR engine 722 may process the resulting OCR data and return a 17 character VIN number.

In some cases, a single filter applied across the entire image will not work well, such as when there is dirt, or reflections on the glass/window/windshield between the user's camera and the VIN number behind the glass/window/windshield. In such cases, the advanced enhancement routine is used to clean up the image one character (a letter or a number) at a time. One or more techniques may be used to detect text in the image. For example, the stroke width transform (SWT) text detection algorithm from "DETECTING TEXT IN NATURAL SCENES WITH STROKE WIDTH TRANSFORM," presented by Epshtein, B., Ofek, E., and Wexler, Y. at CVPR 2010, may be used.

In some embodiments, bounding boxes may then be placed around each character detected by stroke width. In some embodiments, bounding boxes are first placed on characters that are recognized (step 710) and then placed on characters that are identified but not recognized (step 712). Each character is then extracted from the original image and individually sigmoid filtered (or otherwise subjected to contrast enhancement) (step 714). In some embodiments, the individual cleaned characters may then be subject to OCR processing, for instance, using Tesseract OCR (step 716). In other embodiments, however, the characters are placed back into a blank background image (step 718) and the resulting cleaned image is then sent to OCR processing (step 720), for instance, using Tesseract OCR. This replacement into a blank image has the added benefit of handling any tilt in the original image.

The above described process can be intimately tied to the mobile price check application running on the client device (e.g., a user's cellular phone, smartphone, laptop, tablet, etc.). For example, the mobile price check application may provide, via a user interface, a window with an aspect ratio similar to a 17 character string. This forces or otherwise guides the user to center and/or fit an image of a VIN in this window, with no additional characters possible. Thus, the whole system works together to provide the best possible OCR result for a VIN: the mobile price check application at the client side (e.g., running on the user's mobile device) forces the best possible image to be captured, the image processing tool at the server side (e.g., running on one or more server machines implementing the VIN-OCR algorithm described above) processes the image and returns the accurate, actual VIN, and the backend service (e.g., online processing module 230) matches the VIN to an actual vehicle in a dealer's inventory, all in real time or substantially in real time.

Returning to FIG. 4, in some cases, the user may choose to scan a bar code for the vehicle. The bar code may be printed on a sticker which may also be behind a glass, window, or windshield. This process can be done using a publicly available bar code scanning technology.

In some cases, the user may choose to manually enter the VIN. As noted above, in some embodiments, the user does not need to enter all of the digits of the VIN. In some cases, the user may only need to enter the last five digits of the VIN. This is possible because, as explained above, initial checks may be performed to determine the user location and the available inventory for a dealer where the user is located. Online processing module 430 may use the five digits entered by the user to search the dealer's inventory and return a unique answer. Since the user does not need to enter all of the digits of the VIN, this feature can provide a good user experience as well as reducing possible errors. In rare cases, online processing module 430 may find two entries in the inventory and let the user pick one.

Finally, in some embodiments, pricing module or agent 437 may be provided that may use the VIN and/or any associated information to determine an upfront or average market price for the identified vehicle. Vehicle pricing is explained below.

Figure 5:
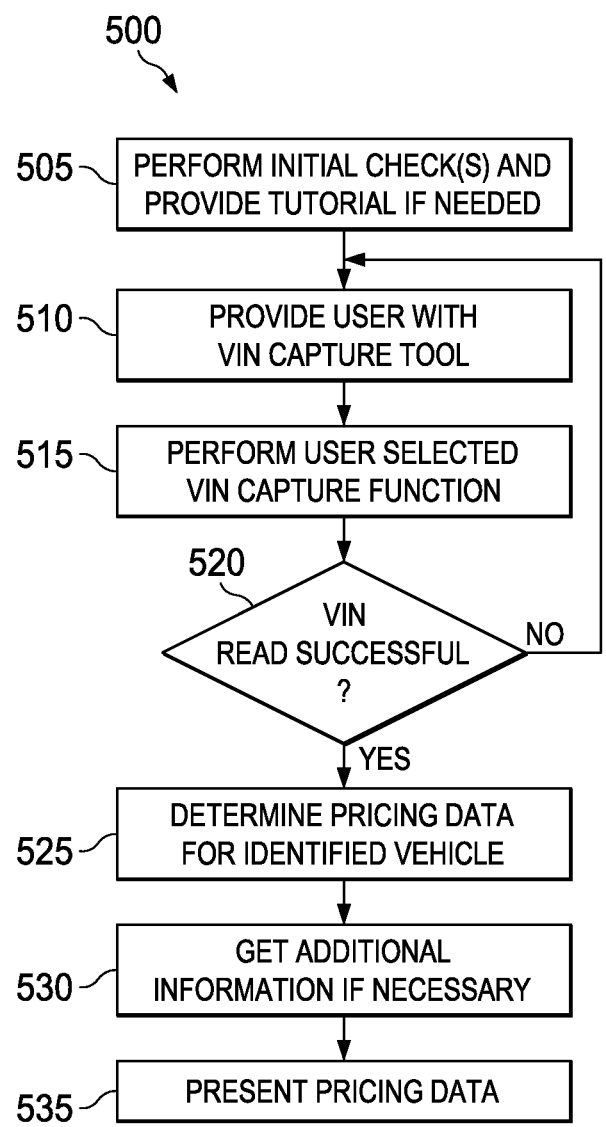
FIG. 5 depicts a flow chart illustrating a method for mobile price check according to one embodiment disclosed herein.

FIG. 5 depicts a flow chart illustrating a method for mobile price check according to one embodiment disclosed herein. In some embodiments, method 500 may begin at step 505 if any of the initial checks and/or tutorial described above is performed. In some embodiments, method 500 may begin at step 510 where a user requesting a price check via a price check application running on their mobile device is provided, via a user interface, with a VIN capture tool. As described above, the VIN capture tool may be configured for providing a selection of VIN capture functions such as VIN image scan, bar code scan, and VIN manual entry. At step 515, method 500 may perform one of the VIN capture functions selected by the user. At step 520, method 500 may determine if a digital readout of the VIN can be obtained. If not, method 500 may prompt the user to try another VIN capture function. If the VIN has been successfully captured, method 500 may proceed to, at step 525, determine pricing data (e.g., a no haggle price offered by the dealer) for a vehicle associated with the VIN. If additional information is needed in order to calculate the dealer price, at step 530, method 500 may ask the user to provide the needed information by, for example, using the question(s) associated with the vehicle generated in an offline process as described above. At step 535, method 500 may then present the calculated dealer price for the vehicle to the user on the user's mobile device. In one embodiment, the entire mobile price check process may only take a second or so.

As those skilled in the art can appreciate, pricing for a vehicle cannot be directly determined from a VIN in many cases. One reason is that the specific options on the vehicle are often not known. Embodiments provide a methodology for determining vehicle price depending on data availability. First, data from various sources, including build data, inventory data, and other data sources, is merged to identify if a VIN exists in the system. If so, the system can pull MSRP, invoice, and other options information from these data sources. Then, the system can apply a pricing model algorithm to get a market average price. Examples of suitable pricing model algorithms can be found in U.S. Patent Application Publication No. 2010/0070343, published Mar. 18, 2010, and U.S. Pat. No. 8,612,314, issued Dec. 17, 2013, which are hereby incorporated by reference in their entireties as if fully set forth herein. The system next uses the invoice and incentives data to compute the upfront price for the specific vehicle.

In many cases, a VIN exists in a dealer system as a piece of recognized inventory. However, there may not be any pricing data associated with the VIN in the dealer system. A user may be asked to enter a total MSRP when the system has no knowledge of the total invoice price and/or the total MSRP for the VIN. The system may check to see if the user-entered MSRP is reasonable. The system uses the VIN to identify the vehicle, from which the system can determine the invoice price using the MSRP associated with the VIN and then arrive at the upfront price for the vehicle.

In one embodiment, the system may determine and produce a market average price to display. In this case, the system may determine whether pricing can be computed without exact options known. A main issue here is that some options or options packages have different invoice/MSRP ratios. As market pricing is based on MSRP and upfront pricing is determined from invoice, this presents a problem. To this end, the system can leverage a VIN decoder to determine the make, model, and trim of the vehicle. An example of a suitable VIN decoder can be found in U.S. Pat. No. 8,661,020, issued Feb. 25, 2014, which is hereby incorporated by reference in its entirety.

If a trim can be uniquely determined, the system proceeds to determine invoice/MSRP ratio of all the potential options for that trim. If the ratio is the same, or within a threshold, then the system can apply the invoice/MSRP options ratio to the recorded MSRP to determine the upfront (dealer) price. Otherwise, the system proceeds to examine all possible combinations of options that could yield the MSRP and review the invoice/MSRP options ratio. Again, if the ratio is within a threshold, the system applies the invoice/MSRP calculation. If not, the system determines which specific options have a different invoice/MSRP ratio and ask the user if those options exist on the window sticker. Based on user feedback, the system can determine if any of the unusual invoice/MSRP options exist and apply that ratio to those while using the standing ratio for the rest.

If a trim cannot be uniquely determined, the system prompts the user to identify the trim and then proceeds to determine the vehicle pricing data as described above.

A specific example will now be described with reference to FIG. 6.

Figure 6:
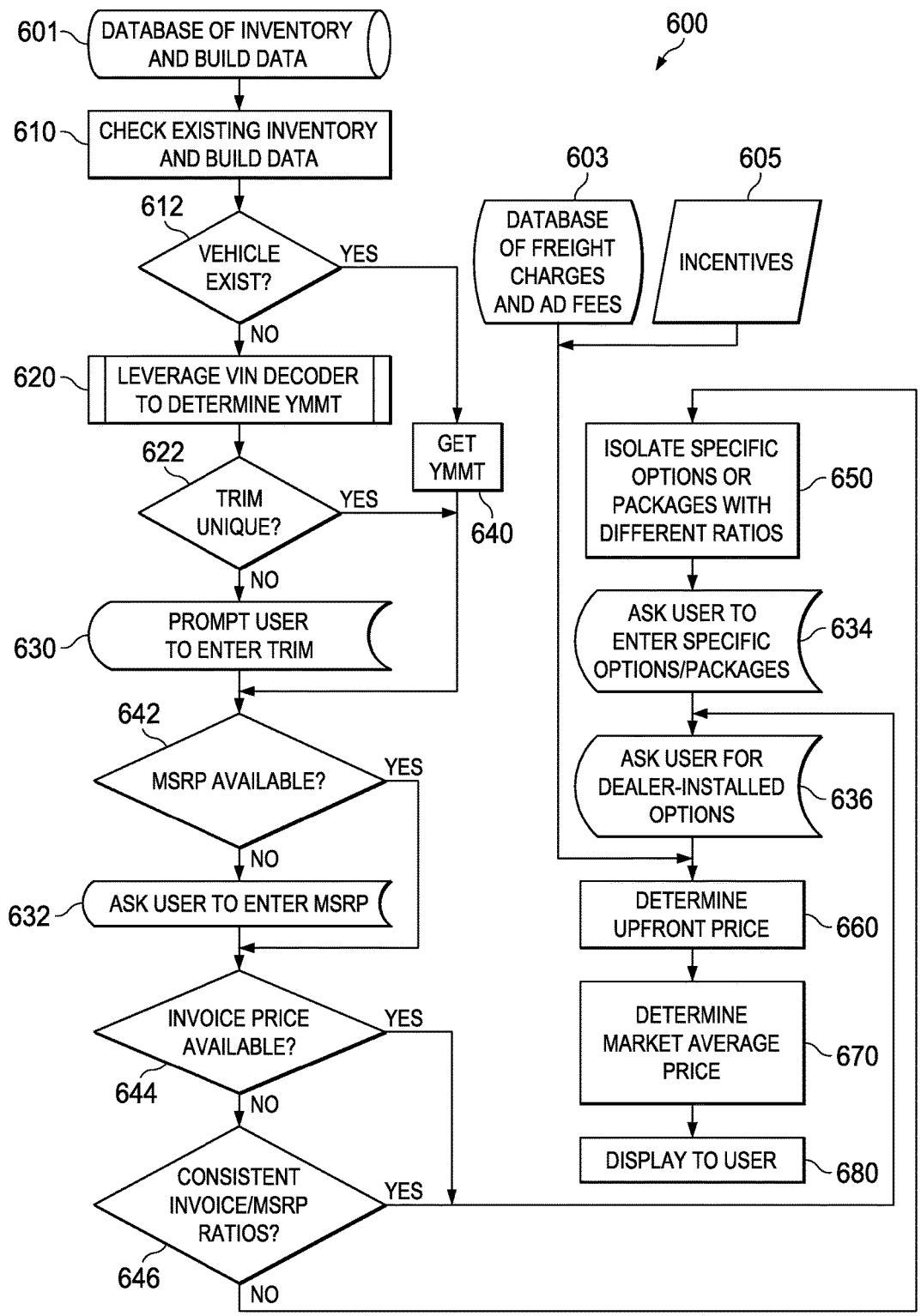
FIG. 6 depicts a flow chart illustrating a method for mobile price check according to one embodiment disclosed herein.

FIG. 6 depicts a flow chart illustrating a method for mobile price check according to one embodiment disclosed herein. In this example, suppose a user goes to a dealership lot and snaps a photo of a VIN of a vehicle that the user is interested in. Process 600 may check database 601 or inventory feeds for the dealership (step 610) and determine if that VIN exists in the system (step 612). If the vehicle cannot be matched in the inventory, a VIN decoder is deployed to determine a unique year, make, model, and trim (YMMT) (step 620). If a unique trim cannot be identified (step 622), the user is prompted to enter the trim (step 630).

Suppose the vehicle can be matched in the inventory (step 640) or the VIN is decoded as belonging to a 2014 Toyota Corolla LE Plus, process 600 next determines whether the MSRP is available for this 2014 Toyota Corolla LE Plus (step 642). If the MSRP is not available, the user is prompted to enter the MSRP (step 632). In this example, the user enters the MSRP of $22,009 as listed on the window sticker of the 2014 Toyota Corolla LE Plus.

In this example, process 600 checks to see if the invoice price is available (step 644). If so, the system does not need a user to provide the MSRP. The system can determine upfront pricing based on the total invoice. If the invoice price is not available, the system may rely on the MSRP provided by a user to determine whether the invoice/MSRP ratio is consistent or within a tolerance of a threshold (step 646). The invoice/MSRP ratios may differ for certain options and packages. For example, in general, the Invoice/MSRP ratio may be 0.62. However, the Invoice/MSRP ratio for the Driver Convenience Package and power moonroof may be 0.89. Also, for the emergency assistance kit the Invoice/MSRP ratio may be 0.83 and for the first aid kit the Invoice/MSRP ratio may be 0.72. The specific options and/or packages may be identified (step 650) and the user may be prompted for additional information (step 634), as illustrated in FIG. 6.

In this example, the user may be asked questions specific to the 2014 Toyota Corolla LE Plus. An example question may include user selectable options such as:

Does this vehicle have any of the following pre-installed options or packages?
Please check all that apply:
a. Driver Convenience Package
b. Power Moonroof
c. Emergency Assistance Kit
d. First Aid Kit Suppose the user selects the Driver Convenience Package and the Emergency Assistance Kit, process 600 may proceed to calculate the MSRP associated with each component as follows:

Drivers Convenience Package: MSRP=1510, Invoice=1343
Power Moonroof: MSRP=850, Invoice=757
Emergency Assistance Kit: MSRP=60, Invoice=50

At step 636, process 600 may ask the user for any dealer-installed options that are equipped on the vehicle. Suppose the user enters none and the base vehicle (2014 Toyota Corolla LE Plus) has the following information in the system (e.g., from freight charges and ad fees database 603, etc.): MSRP=18700; Invoice=17314; Freight=810; Regional Ad Fees=322, process 600 may compute the MSRP unaccounted for, which is that attributed to additional options at the standard invoice/MSRP ratio. That is, $MSRP_{typical\_options} = MSRP_{total\_configured} - MSRP_{base} - MSRP_{user\_entered\_options} - Freight = 22009 - 18700 - (1510 - 850 - 60) - 810 = 79$.

Here, $79 is at the typical invoice/MSRP ratio of 0.62. Thus, the invoice for the typical options is 0.62*79=49.

From this, process 600 can compute the configured invoice as $Invoice_{total\_configured} = Invoice_{base} + Invoice_{user\_entered\_options} + Invoice_{typical\_options} + Freight + Ad Fees = 17314 + (1343 + 757 + 50) + 49 + 810 + 322 = \$20645$.

At step 660, the upfront price is computed as $Price_{upfront} = Invoice_{total\_configured} + Invoice\_Offset - Rebates = 20645 + (-400) - 0 = \$20245$. Rebates may be received from incentives database 605.

The average price paid can be computed using a pricing model (step 670). This can be done by entering, via an appropriate application programming interface (API), the data into a pricing model described in Appendix B referenced above. Suppose the pricing model provides that an average price paid for the 2014 Toyota Corolla LE Plus is at an invoice price/MSRP ratio of 0.963. This translates to a market average price of $21,201 for the 2014 Toyota Corolla LE Plus. At step 680, the pricing data for the 2014 Toyota Corolla LE Plus, including the upfront price of $20245 and the market average price paid by other people for the 2014 Toyota Corolla LE Plus, may, in some embodiments, communicated to the user (e.g., displayed on the user's mobile device) in real time or substantially real time.

It is noted that, in some embodiments, either the upfront price, or the market average price, or both may be determined. Additional pricing information may be determined and displayed (see, e.g., FIG. 8G). Thus, the above examples are meant to be illustrative and non-limiting.

Figures 8A, 8B:
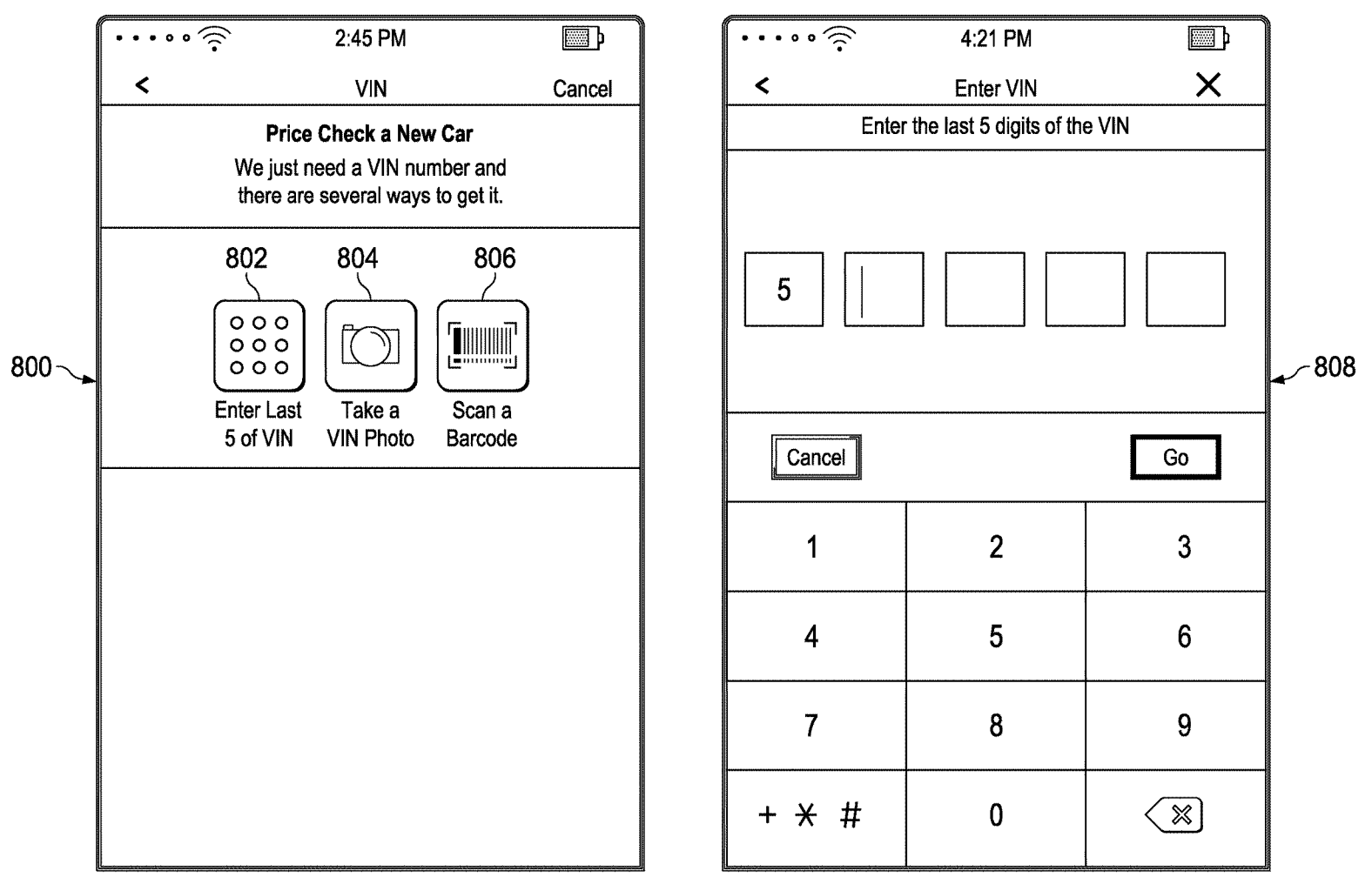
Figure 8C:
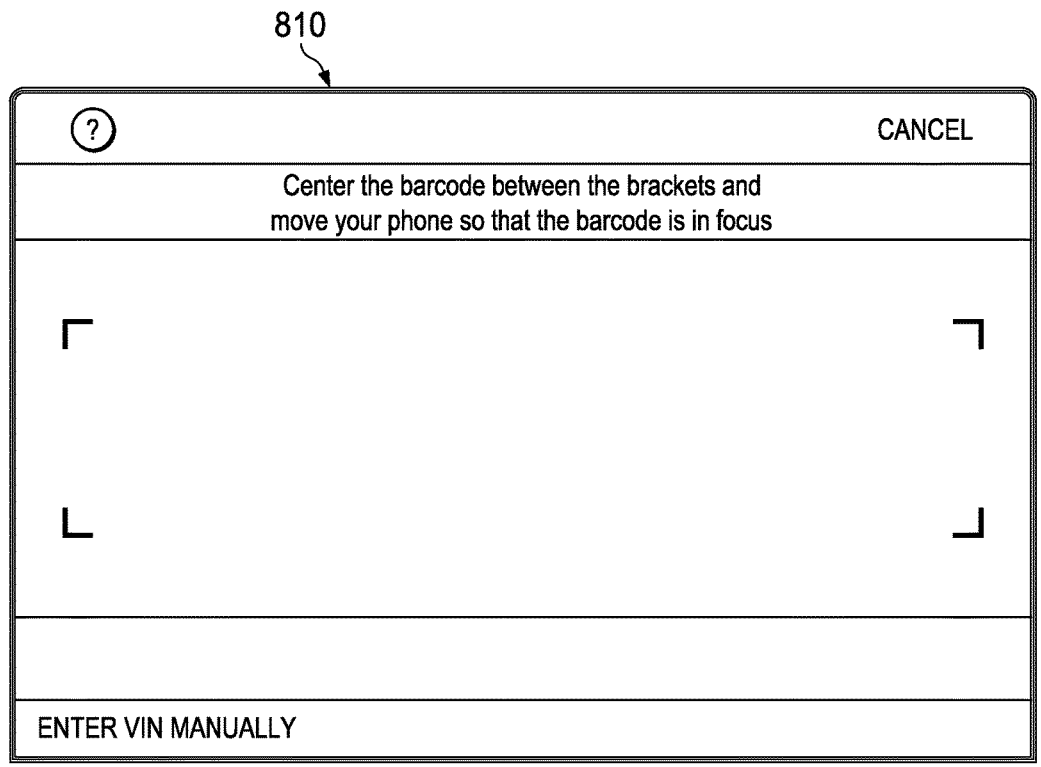

An example of a user interface for a mobile price check application running on a user's mobile device is shown with reference to FIGS. 8A-8G. FIG. 8A depicts a diagrammatic representation of one embodiment of example start screen 800 which may provide options for a consumer to enter a vehicle's VIN. As shown, the user may select control functions (represented by icons 802, 804, 806) related to entering the last 5 digits of the VIN (802), taking a VIN photo (804), or scanning a barcode (806).

FIG. 8B depicts a diagrammatic representation of one embodiment of an example user interface that may be navigated to by having selected function 802 shown in FIG. 8A. In this example, user interface 808 includes a numeric keypad for entering a set of digits of a VIN. It is noted that, in some embodiments, a user interface may allow for entering more than five digits, such as all the digits of a VIN.

FIG. 8C depicts a diagrammatic representation of one embodiment of example interface 810 that may be navigated to by selecting function 806 shown in FIG. 8A. Function 806 may make use of the mobile device's camera to take a picture of a bar code. In addition, in some embodiments, an option may be provided for the user to manually enter the VIN or part of the VIN, as illustrated in FIG. 8C.

Figure 8D:
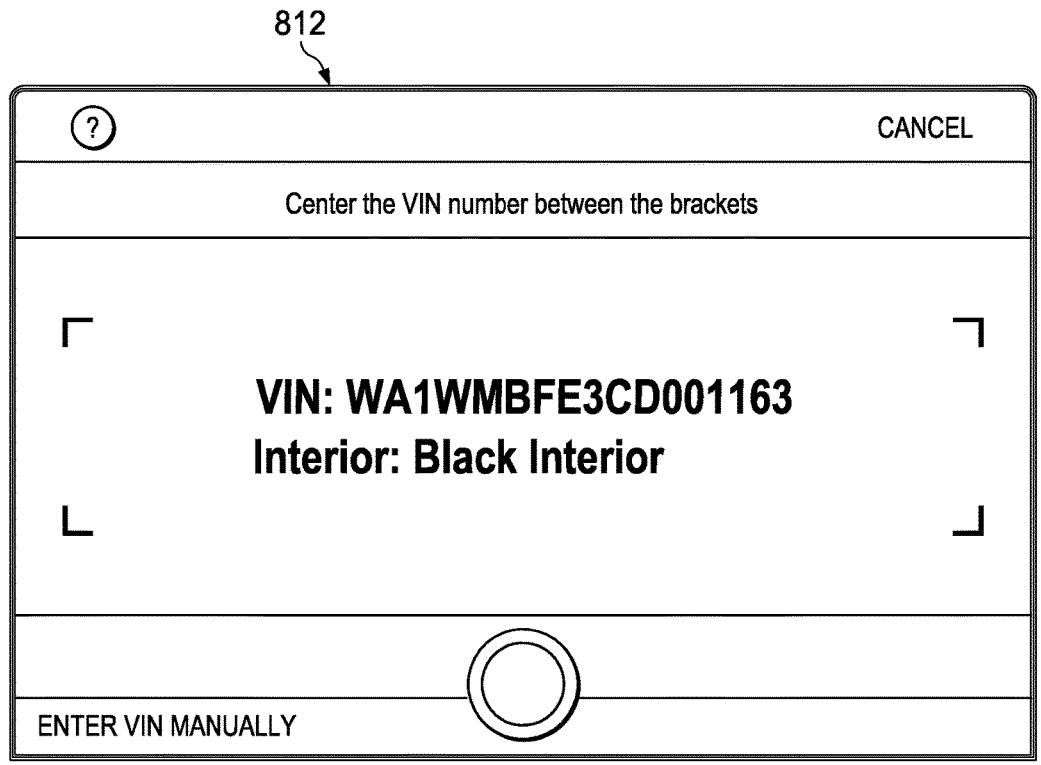

FIG. 8D depicts a diagrammatic representation of one embodiment of example interface 812 that may be navigated to by selecting function 804 shown in FIG. 8A. Function 804 may make use of the mobile device's camera to take a picture of a VIN. Again, in some embodiments, an option may be provided for the user to manually enter the VIN or part of the VIN, as illustrated in FIG. 8D.

As noted above, some embodiments allow a user to enter additional information that may be used to determine the upfront dealer and average market prices. To this end, FIG. 8E depicts a diagrammatic representation of one embodiment of example interface 814 that allows a user to enter an MSRP while FIG. 8F depicts a diagrammatic representation of one embodiment of example interface 816 that allows a user to enter price(s) for dealer-added accessories. Those skilled in the art will appreciate that other interfaces (not shown) may be provided that may ask the user additional questions.

Finally, FIG. 8G depicts a diagrammatic representation of one embodiment of example interface 818 showing price check results on a particular VIN, including an upfront dealer price and out the door price (the upfront dealer price plus applicable fees and taxes). As illustrated in FIG. 8G, the user (which can be anyone, for instance, a consumer or a dealer) may proceed to do a price check on another vehicle. In some embodiments, the price check results associated with a VIN may be persisted on the user's device, at the backend on a server machine, hosted in a cloud, or a combination thereof.

Those skilled in the art will appreciate that the price check system described above may be implemented in various ways. For example, the mobile price check application may be provided to a client device via Software As A Service, a web application, or a mobile application. As another example, the price check system may be deployed on a company's premises or hosted in a cloud computing environment. Other implementations are also possible.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used, individually or in conjunction with another programming language, to implement the routines, methods or programs of embodiments of the invention described herein, including C, C++, Java, JavaScript, HTML, or any other programming or scripting language, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved by any means as is known in the art. For example, distributed or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein, the meaning of "in" includes "in" and "on" unless the context clearly dictates otherwise. The scope of the present disclosure should be determined by the following claims and their legal equivalents.

What is claimed is:

1. A system comprising:
   a server computer having a processor, a non-transitory computer memory, and a price check system; and
   a client device having a processor, a non-transitory computer member, and a mobile price check application, the client device communicatively connected to the server computer over a network, wherein the price check system running on the server computer is configured to:
   receive a vehicle identification number from the mobile price check application running on the client device or determine the vehicle identification number via an image from the mobile price check application running on the client device, wherein the price check system comprises an image processing tool implementing an algorithm for processing the image from the mobile price check application to obtain the vehicle identification number, wherein the image processing tool is configured to perform preprocessing on the image before performing an optical character recognition, the preprocessing including performing a character-by-character extraction to extract characters from the image and enhancing the extracted characters, wherein the optical character recognition is performed on the extracted characters thus enhanced;

determine if build data is available, in a data store storing build data obtained or received from vehicle manufacturers, for a vehicle associated with the vehicle identification number;

if build data is available for the vehicle associated with the vehicle identification number:
   access the build data in a corresponding build data source;
   determine one or more prices for the vehicle based on the build data from the data store; and
   provide the one or more prices for the vehicle to the mobile price check application running on the client device; and if build data is not available in the data store for the vehicle associated with the vehicle identification number:
   determine configuration information needed to calculate pricing data for the vehicle associated with the vehicle identification number;
   generate questions for obtaining the configuration information needed for the vehicle associated with the vehicle identification number;
   prepare and send a request with the questions to the mobile price check application running on the client device, wherein the mobile price check application is configured to:
   prompt a user of the client device for the configuration information on the vehicle associated with the vehicle identification number; and
   communicate the configuration information on the vehicle associated with the vehicle identification number to the price check system, wherein the price check system is further configured to:
   determine one or more prices for the vehicle based on the configuration information on the vehicle associated with the vehicle identification number from the mobile price check application running on the client device; and
   provide the one or more prices for the vehicle associated with the vehicle identification number to the mobile price check application running on the client device.

2. The system of claim 1, wherein the price check system is further configured to:
   request additional configuration information not included in the build data; and
   determine one or more prices based on the additional configuration information and the build data.

3. The system of claim 1, wherein the one or more prices includes at least one of an upfront dealer price or an average market price.

4. The system of claim 1, wherein the algorithm comprises a first routine including an enhancement filter and a second routine including a character-by-character extraction.

5. A method, comprising:
   receiving, by a server computer having a processor, a non-transitory computer memory, and a price check system, a vehicle identification number from a mobile price check application running on a client device or determining the vehicle identification number via an image from the mobile price check application running on the client device, the determining the vehicle identification number comprising processing, by an image processing tool of the price check system, the image from the mobile price check application to obtain the vehicle identification number, the image processing tool preprocessing the image before performing an optical character recognition, the preprocessing including performing a character-by-character extraction to extract characters from the image and enhancing the extracted characters, wherein the optical character recognition is performed on the extracted characters thus enhanced;
   the price check system determining if build data is available, in a data store storing build data obtained or received from vehicle manufacturers, for a vehicle associated with the vehicle identification number;
   if build data is available for the vehicle associated with the vehicle identification number:
      the price check system determining one or more prices for the vehicle based on the build data from the data store and providing the one or more prices for the vehicle to the mobile price check application running on the client device; and
   if build data is not available in the data store for the vehicle associated with the vehicle identification number:
      the price check system determining configuration information needed to calculate pricing data for the vehicle associated with the vehicle identification number, generating questions for obtaining the configuration information needed for the vehicle associated with the vehicle identification number, and preparing and sending a request with the questions to the mobile price check application running on the client device;
      the mobile price check application prompting a user of the client device for the configuration information on the vehicle associated with the vehicle identification number;
      the mobile price check application communicating the configuration information on the vehicle associated with the vehicle identification number to the price check system;
      the price check system determining one or more prices for the vehicle based on the configuration information on the vehicle associated with the vehicle identification number from the mobile price check application running on the client device; and
      the price check system providing the one or more prices for the vehicle associated with the vehicle identification number to the mobile price check application running on the client device.

6. The method according to claim 5, further comprising:
   the price check system requesting additional configuration information not included in the build data; and
   the price check system determining one or more prices based on the additional configuration information and the build data.

7. The method according to claim 5, wherein the one or more prices includes at least one of an upfront dealer price or an average market price.

8. The method according to claim 5, wherein the image processing tool implements an algorithm comprising a first routine including an enhancement filter and a second routine including a character-by-character extraction.

9. A computer program product comprising a non-transitory computer readable medium storing instructions, translatable by a processor of a server computer embodying a price check system to perform:
   receiving a vehicle identification number from a mobile price check application running on a client device or determining the vehicle identification number via an image from the mobile price check application running on the client device, the determining the vehicle identification number comprising processing the image from the mobile price check application to obtain the vehicle identification number, wherein the processing includes preprocessing the image before performing an optical character recognition, the preprocessing including performing a character-by-character extraction to extract characters from the image and enhancing the extracted characters, wherein the optical character recognition is performed on the extracted characters thus enhanced;

determining if build data is available, in a data store storing build data obtained or received from vehicle manufacturers, for a vehicle associated with the vehicle identification number;

if build data is available for the vehicle associated with the vehicle identification number:
    accessing the build data in a corresponding build data source;
    determining one or more prices for the vehicle based on the build data from the data store; and
    providing the one or more prices for the vehicle to the mobile price check application running on the client device; and if build data is not available in the data store for the vehicle associated with the vehicle identification number:
    determining configuration information needed to calculate pricing data for the vehicle associated with the vehicle identification number;
    generating questions for obtaining the configuration information needed for the vehicle associated with the vehicle identification number; and
    preparing and sending a request with the questions to the mobile price check application running on the client device, wherein the mobile price check application is configured to:
        prompt a user of the client device for the configuration information on the vehicle associated with the vehicle identification number; and
        communicate the configuration information on the vehicle associated with the vehicle identification number to the price check system;
    determining one or more prices for the vehicle based on the configuration information on the vehicle associated with the vehicle identification number from the mobile price check application running on the client device; and
    providing the one or more prices for the vehicle associated with the vehicle identification number to the mobile price check application running on the client device.

10. The computer program product of claim 9, wherein the instructions are further translatable by the processor to perform:
    requesting additional configuration information not included in the build data; and
    determining one or more prices based on the additional configuration information and the build data.

11. The computer program product of claim 9, wherein the one or more prices includes at least one of an upfront dealer price or an average market price.

12. A system comprising:
    a server computer having a processor, a non-transitory computer memory, and a price check system; and
    a client device having a processor, a non-transitory computer memory, and a mobile price check application, the client device communicatively connected to the server computer over a network, wherein the price check system running on the server computer is configured to:
    receive a vehicle identification number from the mobile price check application running on the client device or determine the vehicle identification number via an image from the mobile price check application running on the client device, wherein the price check system comprises an image processing tool implementing an algorithm for processing the image from the mobile price check application to obtain the vehicle identification number, wherein the image processing tool is configured to perform preprocessing on the image before performing an optical character recognition, the preprocessing including performing a character-by-character extraction to extract characters from the image and arranging the extracted characters in a new image, wherein the optical character recognition is performed on the new image;
    determine if build data is available, in a data store storing build data obtained or received from vehicle manufacturers, for a vehicle associated with the vehicle identification number;
    if build data is available for the vehicle associated with the vehicle identification number:
        determine one or more prices for the vehicle based on the build data from the data store; and
        provide the one or mare prices for the vehicle to the mobile price check application; and
    if build data is not available in the data store for the vehicle associated with the vehicle identification number:
        determine configuration information needed to calculate pricing data for the vehicle associated with the vehicle identification number;
        generate questions for obtaining the configuration information needed for the vehicle associated with the vehicle identification number;
        prepare and send a request with the questions to the mobile price check application running on the client device, wherein the mobile price check application is configured to:
            prompt a user of the client device for the configuration information on the vehicle associated with the vehicle identification number; and
            communicate the configuration information on the vehicle associated with the vehicle identification number to the price check system, wherein the price check system is further configured to:
        determine one or more prices for the vehicle based on the configuration information on the vehicle associated with the vehicle identification number from the mobile price check application; and
        provide the one or more prices for the vehicle associated with the vehicle identification number to the mobile price check application running on the client device.

13. The system of claim 12, wherein the price check system is further configured to:
    request additional configuration information not included in the build data; and
    determine one or more prices based on the additional configuration information and the build data.

14. The system of claim 12, wherein the one or more prices includes at least one of an upfront dealer price or an average market price.

15. The system of claim 12, wherein the algorithm comprises a first routine including an enhancement filter and a second routine including a character-by-character extraction.

16. A method, comprising:
receiving, by a server computer having a processor, a non-transitory computer memory, and a price check system, a vehicle identification number from a mobile price check application running on a client device or determining the vehicle identification number via an image from the mobile price check application running on the client device, the determining the vehicle identification number comprising processing, by an image processing tool of the price check system, the image from the mobile price check application to obtain the vehicle identification number, the image processing tool preprocessing the image before performing an optical character recognition, the preprocessing including performing a character-by-character extraction to extract characters from the image and arranging the extracted characters in a new image, wherein the optical character recognition is performed on the new image;
the price check system determining if build data is available, in a data store storing build data obtained or received from vehicle manufacturers, for a vehicle associated with the vehicle identification number;
if build data is available for the vehicle associated with the vehicle identification number:
the price check system determining one or more prices for the vehicle based on the build data from the data store and providing the one or more prices for the vehicle to the mobile price check application running on the client device; and
if build data is not available in the data store for the vehicle associated with the vehicle identification number:
the price check system determining configuration information needed to calculate pricing data for the vehicle associated with the vehicle identification number, generating questions for obtaining the configuration information needed for the vehicle associated with the vehicle identification number, and preparing and sending a request with the questions to the mobile price check application running on the client device;
the mobile price check application prompting a user of the client device for the configuration information on the vehicle associated with the vehicle identification number;
the mobile price check application communicating the configuration information on the vehicle associated with the vehicle identification number to the price check system;
the price check system determining one or more prices for the vehicle based on the configuration information on the vehicle associated with the vehicle identification number from the mobile price check application; and
the price check system providing the one or more prices for the vehicle associated with the vehicle identification number to the mobile price check application running on the client device.

17. The method according to claim 16, further comprising:
the price check system requesting additional configuration information not included in the build data; and
the price check system determining one or more prices based on the additional configuration information and the build data.

18. The method according to claim 16, wherein the one or more prices includes at least one of an upfront dealer price or an average market price.

19. The method according to claim 16, wherein the image processing tool implements an algorithm comprising a first routine including an enhancement filter and a second routine including a character-by-character extraction.

20. A computer program product comprising a non-transitory computer readable medium storing instructions translatable by a processor of a server computer embodying a price check system to perform:
receiving a vehicle identification number from a mobile price check application running on a client device or determining the vehicle identification number via an image from the mobile price check application running on the client device, the determining the vehicle identification number comprising processing the image from the mobile price check application to obtain the vehicle identification number, wherein the processing includes preprocessing the image before performing an optical character recognition, the preprocessing including performing a character-by-character extraction to extract characters from the image and arranging the extracted characters in a new image, wherein the optical character recognition is performed on the new image;
determining if build data is available, in a data store storing build data obtained or received from vehicle manufacturers, for a vehicle associated with the vehicle identification number;
if build data is available for the vehicle associated with the vehicle identification number:
determining one or more prices for the vehicle based on the build data from the data store; and
providing the one or more prices for the vehicle to the mobile price check application running on the client device; and
if build data is not available in the data store for the vehicle associated with the vehicle identification number:
determining configuration information needed to calculate pricing data for the vehicle associated with the vehicle identification number;
generating questions for obtaining the configuration information needed for the vehicle associated with the vehicle identification number; and
preparing and sending a request with the questions to the mobile price check application running on the client device, wherein the mobile price check application is configured to:
prompt a user of the client device for the configuration information on the vehicle associated with the vehicle identification number; and
communicate the configuration information on the vehicle associated with the vehicle identification number to the price check system;
determining one or more prices for the vehicle based on the configuration information on the vehicle associated with the vehicle identification number from the mobile price check application running on the client device; and providing the one or more prices for the vehicle associated with the vehicle identification number to the mobile price check application running on the client device.

21. The computer program product of claim 20, wherein the instructions are further translatable by the processor to perform:
   requesting additional configuration information not included in the build data; and
   determining one or more prices based on the additional configuration information and the build data.

22. The computer program product of claim 20, wherein the one or more prices includes at least one of an upfront dealer price or an average market price.

* * * * *